United States Patent
Qin

(10) Patent No.: US 10,292,193 B2
(45) Date of Patent: May 14, 2019

(54) WIRELESS COMMUNICATION DEVICE AND WIRELESS COMMUNICATION METHOD FOR ADJUSTING DEVICE COVERAGE ACCORDING TO RECEPTION FEEDBACK OF D2D COMMUNICATION

(71) Applicant: SONY CORPORATION, Tokyo (JP)

(72) Inventor: Zhongbin Qin, Beijing (CN)

(73) Assignee: SONY CORPORATION, Tokyo (JP)

( * ) Notice: Subject to any disclaimer, the term of this patent is extended or adjusted under 35 U.S.C. 154(b) by 58 days.

(21) Appl. No.: 15/315,228

(22) PCT Filed: Jul. 30, 2015

(86) PCT No.: PCT/CN2015/085537
§ 371 (c)(1),
(2) Date: Nov. 30, 2016

(87) PCT Pub. No.: WO2016/015660
PCT Pub. Date: Feb. 4, 2016

(65) Prior Publication Data
US 2017/0202041 A1 Jul. 13, 2017

(30) Foreign Application Priority Data
Jul. 31, 2014 (CN) .......................... 2014 1 0372960

(51) Int. Cl.
*H04W 76/14* (2018.01)
*H04L 1/16* (2006.01)
(Continued)

(52) U.S. Cl.
CPC ......... *H04W 76/14* (2018.02); *H04J 13/0062* (2013.01); *H04L 1/16* (2013.01);
(Continued)

(58) Field of Classification Search
CPC ... H04W 24/10; H04W 52/24–52/248; H04W 52/383; H04W 92/18;
(Continued)

(56) References Cited

U.S. PATENT DOCUMENTS

2012/0314600 A1 12/2012 Zeira
2013/0322276 A1* 12/2013 Pelletier ............... H04W 24/10
370/252

(Continued)

FOREIGN PATENT DOCUMENTS

CN 103139889 A 6/2013
CN 103621157 A 3/2014

OTHER PUBLICATIONS

International Search Report dated Oct. 29, 2015 in PCT/CN2015/085537 filed Jul. 30, 2015.

*Primary Examiner* — Pao Sinkantarakorn
(74) *Attorney, Agent, or Firm* — Xsensus LLP

(57) ABSTRACT

A wireless communication device and a wireless communication method. The wireless communication device which is used for a user equipment side includes a signal transceiving apparatus and a control apparatus. The signal transceiving apparatus is configured to transmit a device-to-device communication signal, and receive a feedback signal of other wireless communication devices for the communication signal. The control apparatus is configured to determine receiving quality of other wireless communication devices for the communication signal based on the feedback signal, and adjust the signal coverage range of a user equipment based on the distribution of the receiving quality of other wireless communication devices.

18 Claims, 8 Drawing Sheets

(51) Int. Cl.
*H04J 13/00* (2011.01)
*H04W 24/10* (2009.01)
*H04W 72/08* (2009.01)
*H04W 72/02* (2009.01)

(52) U.S. Cl.
CPC ......... *H04W 24/10* (2013.01); *H04W 72/085* (2013.01); *H04W 72/02* (2013.01)

(58) Field of Classification Search
CPC ......... H04L 43/06–43/067; H04B 7/06; H04B 7/0619–7/065
See application file for complete search history.

(56) References Cited

U.S. PATENT DOCUMENTS

| | | |
|---|---|---|
| 2014/0198694 A1 | 7/2014 | Yang et al. |
| 2014/0274196 A1 | 9/2014 | Dai et al. |
| 2015/0139111 A1 | 5/2015 | Fodor et al. |
| 2016/0198504 A1* | 7/2016 | Seo ....................... H04W 76/14 370/329 |

* cited by examiner

WIRELESS COMMUNICATION DEVICE AND WIRELESS COMMUNICATION METHOD FOR ADJUSTING DEVICE COVERAGE ACCORDING TO RECEPTION FEEDBACK OF D2D COMMUNICATION

FIELD

The disclosure generally relates to the technical field of wireless communication, and in particular to a wireless communication device and a wireless communication method for a user equipment (UE) side, and a wireless communication device and a wireless communication for a base station side, which are used for controlling a device-to-device (D2D) communication.

BACKGROUND

D2D communication is a new technology which enables a direct communication between terminals by multiplexing recourses in a cell thereby enhancing overall performance of a system. D2D communication may include one-to-one communication between terminal devices and one-to-many communication between terminal devices. For example, in a multicast D2D communication scenario as shown in FIG. 10, a user equipment (UE) 1001 functioning as a master UE of a D2D communication performs the D2D communication with multiple other UEs within its communication coverage 1003.

In the 3GPP LTE-A Rel-12 standard, the following two D2D communication modes are defined: the network-assisted D2D resource assignment mode and the resource assignment mode based on autonomous selection by a user initiating a D2D communication. In a case where the user initiating a D2D communication is within the network coverage, both of the above two modes can be used. Otherwise, only the second mode can be used. In a D2D broadcast communication, the master UE firstly transmits a discovery signal to potential D2D target UEs, and then transmits a scheduling assignment signal and a data signal. Upon detection of the discovery signal, a D2D receiving end parses the subsequent scheduling assignment signal and the subsequent data transmission signal using information of the discovery signal.

SUMMARY

However, in the absence of feedback information from the receiving end, transmission parameters of the transmitting end can not be adjusted according to the reception effect of the receiving end, thus the usage effect of the signaling procedure and the signaling content in the D2D scenario is affected.

A brief summary of the embodiments of the disclosure will be given hereinafter, so as to provide basic understanding of some aspects of the disclosure. It is to be understood that, this summary is not an exhaustive summary of the invention. It is neither intended to determine a key or important part of the invention, nor intended to define the scope of the invention. It is only intended to give some concepts in a simplified form, to serve as a prelude of the more detailed description discussed later.

According to an aspect of the disclosure, it is provided a wireless communication device for a user equipment (UE) side, which includes a signal transceiving unit and a control unit. The signal transceiving unit is configured for transmitting a device-to-device (D2D) communication signal, and receiving a feedback signal from another wireless communication device with respect to the communication signal. The control unit is configured for determining a reception quality of the other communication device with respect to the communication signal based on the feedback signal, and adjusting a signal coverage of the UE based on a profile of the reception quality of the other communication device.

According to another aspect of the disclosure, it is provided a wireless communication device for a UE side, which includes a signal transceiving unit and a control unit. The signal transceiving unit is configured for transmitting a D2D communication signal and reporting a coverage adjustment request signal to a network, and receiving a feedback signal from another wireless communication device with respect to the communication signal and a coverage adjustment confirmation signal transmitted by the network. The control unit is configured for determining a reception quality of the other communication device with respect to the communication signal based on the feedback, and adjusting a signal coverage of the UE based on a profile of the reception quality of the other communication device or according to a control command in the network coverage adjustment confirmation signal. Wherein the coverage adjustment request signal includes at least one of: a request for adjusting a transmission power and/or a modulation coding scheme; an offset value for adjusting the transmission power and/or the modulation coding scheme; the profile of the reception quality of the other communication device; and whether a transmission parameter of a D2D discovery signal or a transmission parameter of a D2D data transmission signal is to be adjusted. According to another aspect of the disclosure, it is provided a wireless communication method performed by a wireless communication device, which includes: transmitting a D2D communication signal; receiving a feedback signal from another wireless communication device with respect to the communication signal; determining reception quality of the other communication device with respect to the communication signal based on the feedback signal; and adjusting a coverage of the communication signal based on a profile of the reception quality of the other communication device.

According to yet another aspect of the disclosure, it is provided a wireless communication device for a UE side, which includes a reception unit and a feedback unit. The reception unit is configured for receiving a D2D communication signal from another UE. The feedback unit is configured for transmitting a feedback signal with respect to the communication signal. Wherein the feedback signal includes at least one of identification information of the wireless communication device and reception quality information regarding the communication signal.

According to still another aspect of the disclosure, it is provided a wireless communication method performed by a wireless communication device, which includes: receiving a D2D communication signal from another UE; and transmitting a feedback signal with respect to the communication signal. Wherein the feedback signal includes at least one of identification information of the communication device and reception quality information regarding the communication signal.

According to yet another aspect of the disclosure, it is provided a communication device for a base station side, which includes a transceiving unit and a determination unit. The transceiving unit is configured for receiving reported information from a first communication device, the reported information including information on reception quality of an object communication device to perform D2D communication with the first communication device with respect to a communication signal of the first communication device, or suggested transmission parameter adjustment information of the first communication device. The determination unit is configured for determining, based on a profile of the reception quality of the object communication device or the suggested transmission parameter adjustment information of the first communication device, an adjustment manner for a coverage of the communication signal of the first communication device for the D2D communication.

According to still another aspect of the disclosure, it is provided a wireless communication control method performed by a base station, which includes: receiving reported information from a first communication device, the reported information including information on reception quality of an object communication device to perform D2D communication with the first communication device with respect to a communication signal of the first communication device, or suggested transmission parameter adjustment information of the first communication device; and determining, based on a profile of the reception quality of the object communication device or the suggested transmission parameter adjustment information of the first communication device, an adjustment manner for a coverage of the communication signal of the first communication device for the D2D communication.

With the embodiments of the disclosure, the coverage is adjusted according to the overall reception effect of the D2D communication receiving end, thereby facilitating effective control of the power consumption of the UE initiating the D2D communication, enhancing the transmission efficiency, and reducing undesired interference, while maintaining the quality of the D2D communication.

BRIEF DESCRIPTION OF THE DRAWINGS

The present disclosure can be better understood by referring to the following description taken in conjunction with the accompanying drawings. Same or similar reference characters indicate same or similar parts throughout the accompanying drawings. The accompanying drawings are included in the description together with the following specifications as a part of the description for further illustrating preferred embodiments with examples and explaining the principle and advantages of the present disclosure. In the accompanying drawings.

DETAILED DESCRIPTION OF THE EMBODIMENTS

Embodiments of the present disclosure are described below with reference to the companying drawings. Elements and features described in a companying drawing or an embodiment may be combined with elements and features illustrated in one or more other companying drawings or embodiments in the present disclosure. It should be noted that presentation and explanation of irrelevant components and processes known by those skilled in the art are omitted in the companying drawings and the description for clarity.

Figure 1:
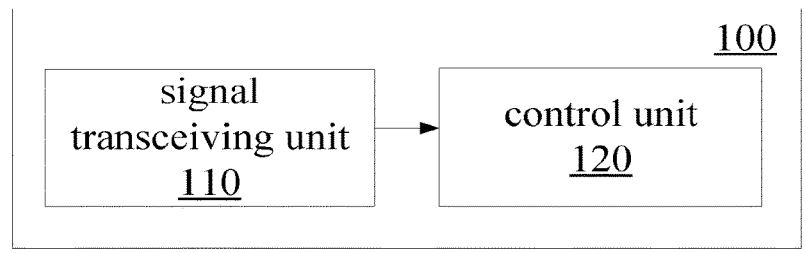
FIG. 1 is a block diagram showing a configuration example of a wireless communication device for a UE side according to an embodiment of the disclosure.

As shown in FIG. 1, according to an embodiment, a communication device 100 for a UE side includes a signal transceiving unit 110 and a control unit 120. The communication device according to the embodiment functions as a communication device side as a D2D communication initiator. In the following, in order to facilitate differentiation, the communication device initiating the D2D communication is referred to as a master communication device, and a communication device functioning as a target of the D2D communication is referred to as a target communication device. In a preferred embodiment of the disclosure, the D2D communication is performed based on a basic mode defined in the 3GPP LTE-A standard.

The signal transceiving unit 110 is configured for transmitting a D2D communication signal, and receiving a feedback signal from another wireless communication device with respect to the communication signal.

As will be further described in the following, the D2D communication signal transmitted by the signal transceiving unit 110 includes, for example, a D2D discovery signal, a D2D scheduling assignment (SA) signal, and a D2D data transmission signal. Specifically, unlike a conventional cellular communication signal, both a transmitting end and a receiving end of various D2D communication signals are user equipments. The D2D discovery signal is used for enabling the target communication device to discover a D2D communication signal that can be received from the master communication device, the D2D scheduling assignment signal is used for transmitting D2D resource scheduling assignment information to the target communication device, and the D2D data transmission signal is used for transmitting data to the target communication device.

Correspondingly, the target communication device may transmit a D2D feedback signal with respect to the communication signal such as the D2D discovery signal, the D2D scheduling assignment signal, and the D2D data transmission signal, where the feedback signal may include information on reception quality of the target communication device with respect to the communication signal.

The control unit 120 is configured for determining the reception quality of the target communication device with respect to the D2D communication signal transmitted by the transceiving unit 110 based on the feedback signal, and adjusting a signal coverage of the UE based on a profile of the reception quality of the target communication device.

It is to be noted that, the communication device 100 according to the embodiment may be used for performing multicast D2D communication or unicast D2D communication. In the case of the multicast D2D communication, the profile of the reception quality of the target communication device may indicate a profile of the reception qualities of multiple target communication devices with respect to the multicast D2D communication signal. In addition, as will be described in the following, the profile of the reception quality of the target communication device may include the number of target communication devices providing feedback signals. In the case of unicast D2D communication, the profile of the reception quality may indicate a reception quality level of a single target communication device with respect to the D2D communication signal. Correspondingly, the control unit may adjust the signal coverage of the master communication device according to the reception quality level. For example, in a case where the reception quality level is lower than a predetermined threshold, the coverage is increased in order to enhance the reception effect, and in a case where the reception quality is higher than the predetermined threshold, the coverage is decreased in order to reduce interference, save energy, or enhance spectrum efficiency. In the following, an example of the multicast D2D communication mode is primarily described. However, it should be understood that the embodiments of the disclosure are also applicable to the unicast D2D communication.

The control unit 120 may determine the reception quality of the target communication device with respect to the D2D communication signal, for example, based on various types of information contained in the feedback signal from the target communication device. For example, the reception quality may be determined based on a signal reception power, a signal reception signal-to-noise ratio (SNR) or signal-to-interference-plus-noise ratio (SINR), a signal block error rate, and the like.

Specifically, in a case of determining the reception quality of the target communication device with respect to the D2D signal based on the signal reception power, the signal reception power may be a reception power of the D2D communication signal received by the target communication device, or may be a reception power of the feedback signal from the target communication device received by the master communication device. In the former case, the target communication device determines the reception power of the D2D communication signal and embeds information indicating the reception power in the feedback signal, thus the control device 120 may determine a D2D channel quality according to the power of the D2D communication signal received by the target communication device and the power of the D2D communication signal transmitted by the master communication device. In the later case, the power with which the target device is to transmit the feedback signal is specified in the D2D communication signal transmitted by the master communication device, and the target communication device transmits the feedback signal with the specified power, thus the master communication device may determine the D2D channel quality according to the power of the received feedback signal and the specified power. As an example, the power with which the target device is to transmit the feedback signal and which is specified in the D2D communication signal transmitted by the master communication device may include multiple levels of specified transmission power, each of which reflects a corresponding D2D communication signal reception power level, for selection by the target device according to an actual receiving power. As another example, the D2D communication signal transmitted by the master communication device may include an indication of the transmission power with which the master communication device transmits the D2D communication signal, and the target device transmits the feedback signal with a same transmission power as the master communication device, thus the master communication device can be informed of the reception power of the target device with respect to the D2D communication signal according to the reception power of the received feedback signal, due to the reciprocity of the channel condition from the master device to the target device and the channel condition from the target device to the master device.

On the other hand, in a case where the signal reception signal-to-noise ratio or signal-to-interference-plus-noise ratio, and the signal block error rate are used as indicators for the reception quality, the target communication device determines the signal reception signal-to-noise ratio, the signal-to-interference-plus-noise ratio, or the signal block error rate of the received D2D communication signal and feeds this information back to the master communication device via a feedback signal.

In summary, the feedback signal according to the disclosure may transmit information reflecting the reception quality with respect to the D2D communication signal in at least one of an explicit mode and an implicit mode.

According to an embodiment, the control device 120 adjusts the signal coverage according to a profile of the reception quality in a predetermined interval.

For example, in the case of the signal-to-interference-plus-noise ratio, the lowest SINR threshold of a D2D multicast broadcast service receiving end is −10 dB(m), and the highest SINR threshold is 30 dB(m). Therefore, an acceptable range of the channel quality may be divided into, for example, 5 intervals, which include [−10, −8], [−8, −3], [−3, 3], [3, 10], [10, 30]. The control unit 120 may adjust the signal coverage of the master device according to the distribution of the reception quality of each target communication device in these intervals.

In addition, in a case where the profile of reception quality is determined based on predetermined intervals, the target communication may not embed a specific reception quality such as the signal reception power, the signal reception signal-to-noise ratio or signal-to-interference-plus-noise ratio, the signal block error rate, and the like, in the feedback signal but only instruct to embed in the feedback signal information of the interval where the reception quality of the target communication device is located. For example, the D2D communication signal of the master communication device may include a predetermined division manner of intervals, and the target communication device determines a corresponding interval according to the reception quality with respect to the D2D communication signal and informs the master communication device of the interval via the feedback signal. It should be understood that, the predetermined division manner of intervals may also be predefined by the system or may be informed in a semi-static manner, where there is common view between the master communication device and the target communication device so that the predetermined division manner of intervals need not to be included in each D2D communication signal, as will be further described in the following in conjunction with specific embodiments.

The control unit 120 may adjust the signal coverage of the master communication device in a variety of manners. For example, the transmission power, a modulation coding scheme, or both of the transmission power and the modulation coding scheme of the signal transceiving unit 110 may be adjusted. More specifically, in a case where the signal coverage is to be increased, the control unit 120 may increase the transmission power of the signal transceiving unit 110, or decrease a modulation coding efficiency of the modulation coding scheme of the D2D communication signal transmitted by the signal transceiving unit 110, i.e., adopt a modulation coding scheme with a higher robustness. In a case where the signal coverage is to be decreased, the control unit 120 may decrease the transmission power of the signal transceiving unit 110, or increase the modulation coding efficiency of the modulation coding scheme of the D2D communication signal transmitted by the signal transceiving unit 110, i.e., adopt a modulation coding scheme with a lower robustness.

Figure 2:
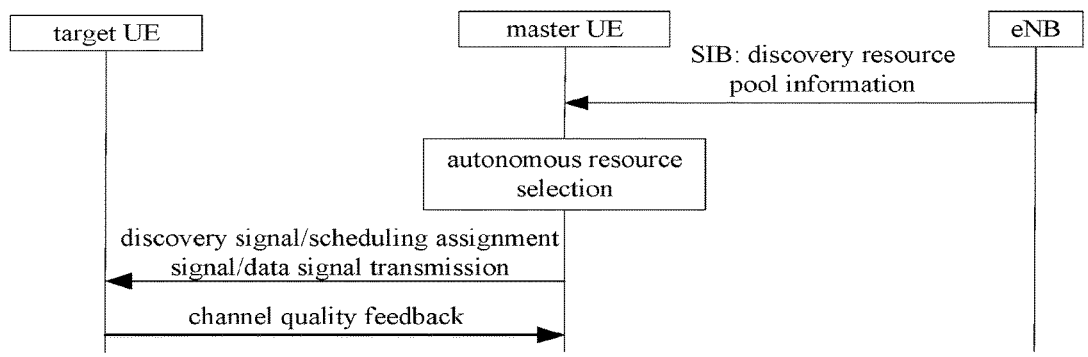
FIG. 2 is a schematic diagram for illustrating a procedure of performing D2D discovery signal transmission and channel quality feedback in an autonomous control mode.
Figure 3:
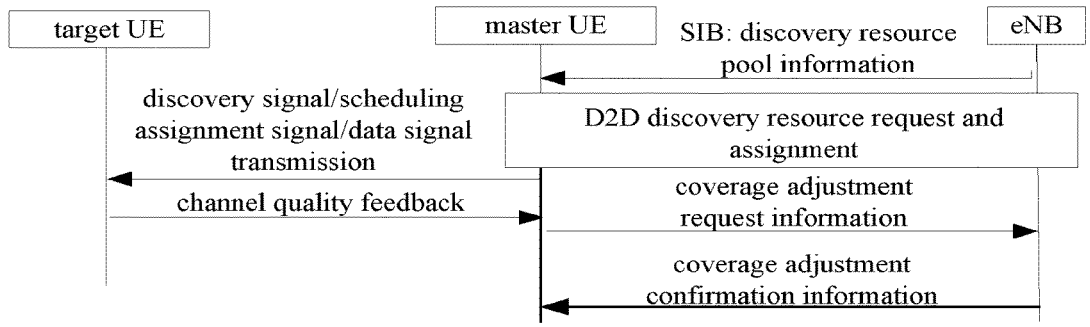
FIG. 3 is a schematic diagram for illustrating a procedure of performing D2D discovery signal transmission and channel quality feedback in a network control mode.

It is to be noted that, the embodiments of the disclosure is applicable to the D2D communication in the network-assisted D2D resource assignment mode as well as the resource assignment mode based on autonomous selection by a user initiating D2D communication. FIG. 2 and FIG. 3 respectively illustrate schematic diagrams of procedures of performing D2D discovery signal transmission and channel quality feedback in an autonomous control mode and in a network control mode.

As shown in FIG. 2, in the autonomous control mode, a base station (eNB) transmits discovery resource pool information to the master communication device via, for example, a system information block (SIB), and the master communication device performs autonomous resource selection and transmits the D2D discovery signal in order to discover a target communication device. The target communication device may transmit the feedback signal to the master communication device based on the reception quality with respect to the discovery signal. Although not shown in the drawings, the base station or another D2D communication central control node such as a D2D cluster head further transmits, for example, data transmission resource pool information to the master communication device, the master communication device performs autonomous resource selection to determine the resource to be used for transmitting data and transmits a scheduling assignment signal and a subsequent data signal, and the target communication device may also perform channel quality feedback based on the D2D scheduling assignment signal and the D2D data transmission signal subsequently transmitted by the master communication device. The master communication device may determine an adjustment of the signal coverage, such as an adjustment of the transmission power or the modulation coding scheme, based on the reception quality with respect to the discovery signal/scheduling assignment signal/data signal fed back by the target communication device.

As shown in FIG. 3, in the network control mode, the master communication device transmits the discovery resource pool information to the base station via, for example, the system information block (SIB), the master communication device determines a D2D discovery resource request and an assignment manner by interacting with the base station, and transmits the D2D discovery signal in order to discover a target communication device. The target communication may transmit the feedback signal to the master communication device based on the reception quality with respect to the discovery signal. In the network control mode, the master communication device may also receive scheduling information regarding, for example, specific data signal transmission resources, from the base station, and transmit the D2D communication data to the target communication device using corresponding resources. The target communication device may also perform channel quality feedback based on the D2D scheduling assignment signal and the D2D data transmission signal subsequently transmitted by the master communication device. Further, in an exemplary embodiment of the disclosure, the master communication device may transmit coverage adjustment request information to the base station, receive coverage adjustment confirmation information fed back by the base station and perform coverage adjustment accordingly.

As described above, in the resource assignment mode based on autonomous selection by an initiating user, similarly to the above embodiment, the control unit may adjust the signal coverage according to a predetermined strategy based on the profile of the reception quality of the target communication device. On the other hand, with respect to the network-assisted D2D resource assignment mode, in the wireless communication device according to an embodiment, the control unit may adjust the signal coverage according to a network control command included in the coverage adjustment confirmation information, where the control command is based on the profile of the reception quality of the target communication device. In the above example, the coverage adjustment request information may include reception quality information of the target communication device for the network side to decide an adjustment scheme. Further, the coverage adjustment request information may also include a recommended coverage adjustment scheme determined by the master communication device based on the reception quality of the target communication device for the network side to confirm. Correspondingly, the network control command may include simply confirmation information for approving/rejecting the adjustment request, or may include specific adjustment scheme indication information such as adjustment parameters for power/modulation coding scheme. In other words, in the network-assisted D2D resource assignment mode, the adjustment manner of the coverage of the master communication device of the D2D communication may be determined at the network side, and the control unit of the master communication device adjusts the signal coverage according to the control command from the network.

In the following, the predetermined strategy according to which the master communication device adjusts the signal coverage of the master communication device based on the profile of the reception quality of the target communication device is described in more detail. It should be understood that, a person skilled in the art may also be informed, according to the following description, of operations to be performed at the network side in the case of the network side deciding the adjustment of the signal coverage of the master communication device based on the reception quality of the target communication device.

Firstly, the master communication device may adjust the signal coverage based on the number of the target communication devices from which the feedback signals are received as the profile of the reception quality of the target communication device. That is, in a case where the number of the target communication devices covered by the D2D communication is too small (for example, lower than a predetermined threshold which can be determined according to a type, a purpose, and the like, of the D2D communication), the coverage may be increased, and in a case where the number of the target device is too great (for example, higher than a predetermined threshold which can be determined according to the type and the purpose of the D2D communication, processing capacity of the master communication device, and the like), the coverage may be decreased.

Further, in a case of adjusting the signal coverage according to the distribution of the reception quality in a predetermined interval, if a sufficient number of target communication devices are located in an interval with better reception channel quality, the coverage shrinking may be performed appropriately, for example, the transmission power may be decreased or the modulation coding efficiency of the modulation coding scheme may be increased, in order to enhance the transmission efficiency. In contrast, if a sufficient number of target communication devices are located in an interval with a relatively low reception channel quality, the coverage expansion may be performed appropriately, for example, the transmission power may be increased or the modulation coding efficiency of the modulation coding scheme may be decreased, in order to enhance the communication quality. Here, the procedure of shrinking and expansion can be considered as adjusting the communication quality of the target communication device to an interval with worse communication quality or to an interval with better communication quality.

Particularly, according to an embodiment, the control unit may be configured to determine a decreased signal coverage where: the number or proportion of target communication devices in a predetermined number, for example, X of intervals with a lowest reception quality is lower than a predetermined threshold level; or the number or proportion of target communication devices in a predetermined number, for example, Y of intervals with a highest reception quality is higher than a predetermined threshold level (X and Y are greater than or equal to 1). For example, in a case where the signal reception quality is divided into several (for example, 2 to 5) intervals, the absolute number of target devices in one or more intervals with the lowest or the highest reception quality or the proportion of the number of target devices in these intervals to the number of all target devices may be compared with the threshold level.

Correspondingly, the control unit may be configured to determine an increased signal coverage where: the number or proportion of target communication devices in a predetermined number, for example, M of intervals with the lowest reception quality is higher than a predetermined threshold level; or the number or proportion of target communication devices in a predetermined number, for example, N of intervals with the highest reception quality is lower than a predetermined threshold level (M and N are greater than or equal to 1). For example, in a case where the signal reception quality is divided into several intervals, for example, the absolute number of target devices in one or more intervals with the lowest or the highest reception quality or the proportion of the number of target devices in these intervals to the number of all target devices may be compared with the threshold level.

The above threshold level for the number or proportion may be determined according to a factor such as the type, the purpose and communication load of the D2D communication, the processing capacity of the device, or the like. As mentioned above, the D2D communication signal transmitted by the signal transceiving unit 110 of the master communication device may include the D2D discovery signal, the D2D scheduling assignment signal and the D2D data transmission signal. Correspondingly, the target communication device may transmit feedback signals corresponding to the D2D discovery signal, the D2D scheduling assignment signal and the D2D data transmission signal, respectively. Based on the feedback signal, the control unit 120 of the master communication device may increase or decrease the signal coverage of the master communication device in the above manners. Next, the manners for increasing the signal coverage and decreasing the signal coverage will be described respectively.

According to an embodiment, in a case where the control unit 120 determines to increase the signal coverage of the master communication device based on the reception quality of the target communication device with respect to the D2D discovery signal, the D2D scheduling assignment signal and the D2D data transmission signal, or in a case where the control unit 120 determines to increase the signal coverage according to the network control command, the signal transceiving unit 110 transmits the D2D discovery signal with an adjusted transmission parameter, until the coverage of the D2D discovery signal reaches a predetermined level. In other words, in a case where the control unit 120 determines to increase the signal coverage of the master communication device based on the reception quality of the target communication device with respect to the D2D discovery signal, the D2D scheduling assignment signal and the D2D data transmission signal, the signal transceiving unit 110 needs to transmit the D2D discovery signal again at the increased signal coverage according to the adjustment by the control unit 120. This is because, in a case where the signal coverage is increased, a new object communication device may appear. Therefore, it is necessary to perform the discovery procedure for the D2D communication object again. Further, in a case where a new object communication device appears, the overall profile of the reception quality of the object communication device changes accordingly, thus it may be necessary to further adjust the signal coverage based on the new overall profile. In a case where the coverage of the D2D discovery signal reaches the predetermined level, for example, according to the profile of the signal reception quality of the target communication device, it is not necessary to further adjust the signal coverage level, the D2D scheduling assignment signal and the D2D data transmission signal may be transmitted subsequently at the current coverage. In addition, in a case of determining, based on the feedback signal of the object communication device, that it is necessary to increase the signal coverage during the subsequent D2D scheduling assignment and D2D data transmission, it is still necessary to perform D2D discovery signal transmission and a corresponding determination procedure again.

On the other hand, in a case where the control unit 120 determines to decrease the signal coverage of the master communication device based on the reception quality of the target communication device with respect to the D2D discovery signal, the D2D scheduling assignment signal and the D2D data transmission signal, the signal transceiving unit 110 subsequently transmits the D2D scheduling assignment signal and the D2D data transmission signal with the adjusted transmission parameter. For example, in a case where the control unit 120 determines to decrease the signal coverage of the master communication device based on the reception quality of the target communication device with respect to the D2D discovery signal, according to the adjustment by the control unit 120, the signal transceiving unit 110 may directly transmit the subsequent D2D scheduling assignment signal and the subsequent D2D data transmission signal at the decreased signal coverage without transmitting the D2D discovery signal again at the decreased signal coverage. This is because, in a case where the signal coverage is decreased, generally the number of object communication devices can only be decreased, and no new object communication device may appear, thus it is not necessary to perform the discovery procedure for the D2D communication object again. Similarly, in a case of determining, based on the feedback signal of the object communication device with respect to the D2D scheduling assignment signal or the D2D data transmission signal, to decrease the signal coverage during the D2D scheduling assignment or the D2D data transmission, it is also not necessary to perform the D2D discovery procedure again, and the subsequent D2D scheduling assignment procedure or the subsequent data transmission procedure is performed directly at the decreased signal coverage.

Figure 4:
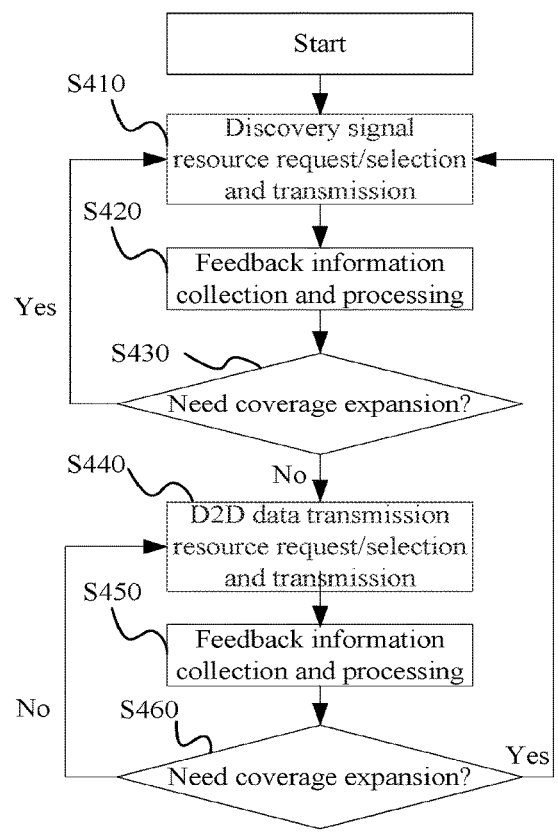
FIG. 4 is a schematic diagram for illustrating a procedure of increasing coverage based on a channel quality feedback with respect to the discovery signal and a channel quality feedback with respect to a scheduling assignment signal or a data transmission signal.

Next, the above procedure is further described with reference to FIG. 4. Firstly, at step S414, a procedure of resource request assignment (for the network control mode) or selection (for the autonomous resource assignment mode) of the D2D discovery signal is performed; then, at step S420, feedback information on reception quality of the target communication device with respect to the D2D discovery signal is collected and analyzed; next, at step S430, it is determined whether to perform signal coverage expansion; if it is necessary to perform coverage expansion ("Yes" in S430), the procedure returns to step S410, where resource request assignment/selection process of the D2D discovery signal is performed again, and the D2D discovery signal is transmitted with the adjusted transmission parameter or a new transmission parameter over an original carrier and/or over a new carrier, until the coverage of the D2D discovery signal reaches the predetermined level ("No" in S430) and the procedure proceeds to the D2D data transmission process.

The case of "No" in S430 may include a case where the signal coverage needs to be decreased and a case where the signal coverage does not need to be adjusted. In a case of determining whether to perform coverage shrinking or to maintain the same coverage as the D2D discovery signal after the feedback information on the reception quality of the target communication device with respect to the D2D discovery signal is collected and analyzed, the procedure proceeds to S440 where the D2D data transmission resource request assignment/selection process is performed, and step S450 where the feedback information on the reception quality of target communication device with respect to the D2D data is collected and analyzed. Next, it is determined whether to perform coverage expansion at S460, if it is determined to perform coverage expansion, the procedure returns to S410 to perform the resource request assignment/selection process of the D2D discovery signal again, in order to transmit the D2D discovery signal with the adjusted transmission parameter or a new transmission parameter over an original carrier and/or over a new carrier to cover a possible new object communication device. In a case where the determination result of S460 is "No", it indicates that the coverage is to be decreased or maintained, and the procedure returns to S440 to proceeds with the D2D data transmission resource request assignment/selection process. It is to be noted that, a preferable embodiment of the disclosure is shown in FIG. 4, however, as will be understood by a person skilled in the art, the D2D signal coverage adjustment scheme according in the disclosure may only include accessing and correspondingly adjusting the reception quality with respect to the discovery signal without adjusting the coverage during the D2D data recourse scheduling/transmission phase, for example, without including S450 and S460.

Figure 10:
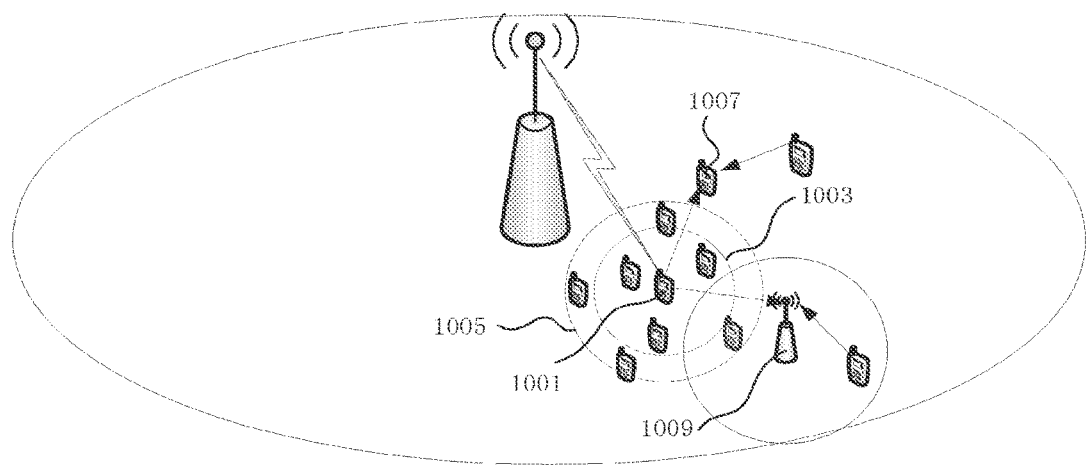
FIG. 10 is a schematic diagram illustrating D2D communication.

In the above, the processing procedure examples of cases where the signal coverage is increased and decreased are described in conjunction with specific embodiments. In a case where the signal coverage is decreased, no more interference will be caused to other users in the communication. In a case where the signal coverage is increased, in a specific example, a master cell may determine, based on position information of the D2D calling user, whether a greater interference is to be caused to another D2D communication or a conventional uplink data transmission in this cell and/or a neighboring cell. If it is determined that the interference will be caused, the master cell may indicate a suitable adjustment scheme to the master communication device via, for example, the above network control command. For example, as shown in FIG. 10, in a case where the signal coverage of the master communication device 1001 is increased from the coverage 1003 to the coverage 1005, greater interference will be caused to a neighboring device 1007 performing a D2D communication or a neighboring small cell base station 1009.

In order to reduce the possibility of such interference, the master communication device may be configured to, for example, select preferentially a scheme with higher signal modulation scheme robustness and a lower transmission power from combinations of the feasible transmission power and the modulation scheme. The master communication device may further determine whether it is necessary to perform a interference reduction process according to information from the base station. During the coverage expansion, the network may determine whether to increase the coverage by increasing the power or by adjusting the modulation coding scheme according to whether the position of the master communication device is close to another D2D communication device in the network control mode or another base station. On the other hand, if it is determined that increase of the transmission power of the master communication device may cause strong interference to uplink transmission of other base stations, the neighboring base station may be informed in advance via, for example, a X2 interface, to adjust an uplink power control parameter of the D2D communication resource block or avoid scheduling on this resource block.

If it is not necessary to consider interference to another communication device or base station, the master communication device may be configured to, for example, select preferentially a scheme with an optimal coverage, a scheme with an optimal energy saving effect, or a scheme with a highest spectral efficiency from combinations of the feasible transmission power and the modulation scheme.

In addition, according to an embodiment, the control unit of the wireless communication device may determine a combination of the transmission power and the modulation coding scheme for reaching the target coverage according to preset information and/or history information. The preset information and/or history information may be acquired, for example, form the network. Alternatively, a previously used combination may be employed.

Next, an exemplary manner of embedding relevant information for determining signal coverage in the D2D communication signal and the feedback signal is described.

According to an embodiment, by means of a Zad-Off Chu scrambled sequence of a D2D discovery signal, a D2D scheduling assignment signal or a D2D data transmission signal and a cycle shift thereof, the wireless communication device 100 implicitly embeds transmission power information and/or reception quality feedback period information of the wireless communication device in a corresponding communication signal. Alternatively, the wireless communication device 100 explicitly embeds the transmission power information and/or reception quality feedback period information of the wireless communication device in the communication signal by adding relevant notification information in a corresponding communication signal.

After determining the reception quality according to the above information contained in the communication signal, the target communication device may embed corresponding information in the feedback signal, and may perform feedback according to the above reception quality feedback period. As described above, in a case where the transmission power of the target communication device with respect to the feedback signal is known (for example, the target communication device transmit the feedback signal with the predetermined power according to the indication in the received D2D communication signal), the master communication device may determine the reception quality of the target communication device with respect to the D2D communication signal according to the actual reception power of the feedback signal. In addition, for example, in a case where the master communication device embeds the transmission power information of the master communication device in the communication signal, the target communication device may determine the signal reception quality, for example, determine a reception quality interval according to the actual reception power, and use a particular Zad-Off Chu cycle shift sequence and/or a particular orthogonal spreading code in the feedback signal to indicate the reception quality such as the interval where the reception quality locates, or may embed an information bit in the feedback signal to feed the reception quality back to the master communication device. With a similar manner, the target communication device may embed the signal reception quality determined based on the signal-to-noise ratio or signal-to-interference-plus-noise ratio, or the signal block error rate in the feedback signal.

More specifically, the D2D communication signal transmitted by the master communication device may include a unique identification number of the present D2D communication, with which the target communication device may determine a set of a Zad-Off Chu parental sequence and the orthogonal spreading code. However, due to the uncertainty of the receiving end, the D2D calling user is unable to specify the cycle shift and the orthogonal spreading code for a potential target user. Therefore, the target communication device may randomly select the cycle shift and the orthogonal spreading code from a selectable set as identification information for transmitting the feedback signal, where the feedback signal may include, for example, the information bit for feeding back the reception quality interval. In another example, it is preset that, each reception quality interval corresponds to a specific set of the cycle shift and the orthogonal spreading code, the target communication device determines the reception quality interval and then randomly select a cycle shift and an orthogonal spreading code from a corresponding set of the cycle shift and the orthogonal spreading code thereby implicitly feeding back the reception channel quality interval to which it belongs via the identification information. In the above example where the feedback signal include explicit feedback in the form of information bit, specifically, for example, in a case where the reception quality is divided into 5 intervals, the interval where the reception quality of the target communication device with respect to the D2D communication signal locates may be fed back using a 5-bit bitmap or a 3-bit code word.

In the network control resource assignment mode, the transceiving unit of the wireless communication device according to an embodiment of the disclosure may be configured for reporting a coverage adjustment (i.e., transmission parameter adjustment) request to the network and receiving a control command containing coverage adjustment feedback of transmission parameter adjustment information. Wherein the transmission parameter adjustment request information includes a request for adjusting the transmission power and/or the modulation coding scheme, an offset value for adjusting the transmission power and/or the modulation coding scheme, the profile of the reception quality of the target communication device, and whether the transmission parameter of the D2D discovery signal or the transmission parameter of the D2D data transmission signal is to be adjusted. According to the reported contents, the network may determine, according to a predetermined strategy, the manner of adjusting the signal coverage of the master communication device. Regarding the specific reporting manner, for example, the master communication device may transmit the above contents together with a buffer status report (BSR) to the network side.

Next, a wireless communication method performed by a wireless communication device corresponding to the above master communication device according to an embodiment of the disclosure is described with reference to FIG. 5.

Figure 5:
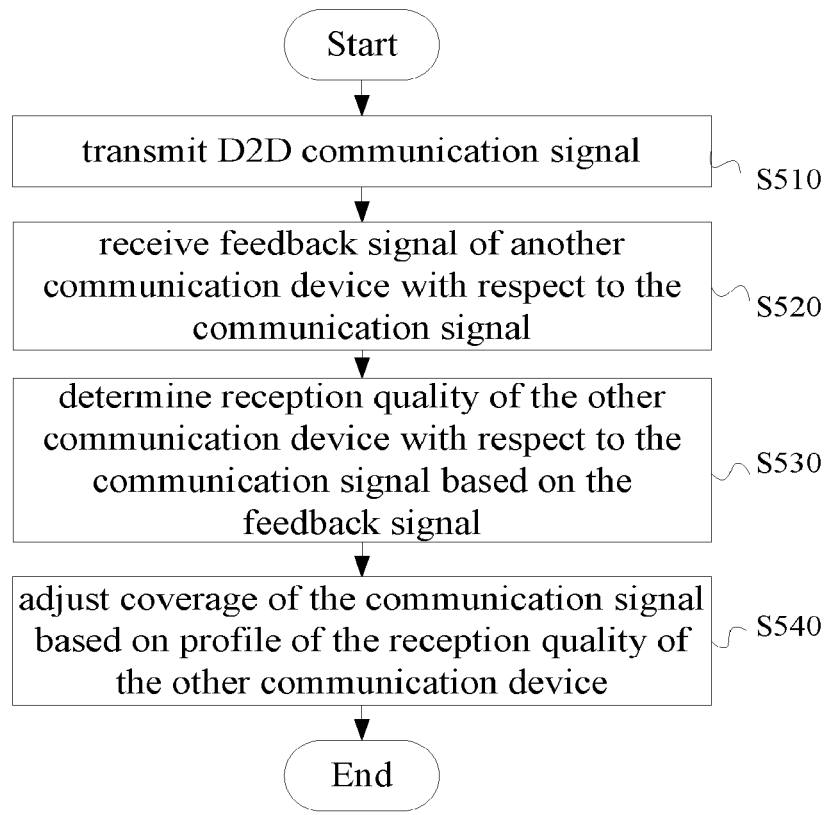
FIG. 5 is a flow chart illustrating a procedure example of a wireless communication method performed by a wireless communication device according to another embodiment of the disclosure.

As shown in FIG. 5, in step S510, a master communication device transmits a D2D communication signal, which may include a D2D discovery signal, a D2D scheduling assignment signal and a D2D data transmission signal.

In step S520, a feedback signal of a target communication device with respect to the D2D communication signal is received.

In step S530, a reception quality of the target communication device with respect to the D2D communication signal is determined based on the feedback signal. Wherein the reception quality may be determined based on a signal reception power, a signal reception signal-to-noise ratio or signal-to-interference-plus-noise ratio, and a signal block error rate.

In step S540, the coverage of the D2D communication signal is adjusted based on a profile of the reception quality of the target communication device.

In a network control mode, the signal coverage may be adjusted according to a control command determined by the network based on the profile of the reception quality of the target communication device. In an autonomous control mode, the signal coverage may be adjusted according to a predetermined strategy based on the profile of the reception quality of the target communication device. Specifically, the signal coverage may be determined to be increased or decreased using the specific manner described in the above embodiments of the wireless communication device.

Similarly, the signal coverage may be adjusted by adjusting a transmission power, a modulation coding scheme, or the transmission power and the modulation coding scheme of the signal.

Embodiments of configuration and corresponding method for the D2D communication initiator side, i.e., the master communication device according to an aspect of the disclosure are described above. In the following, embodiments of configuration and method for a device functioning as the target communication device side according to another aspect of the disclosure are described.

Figure 6:
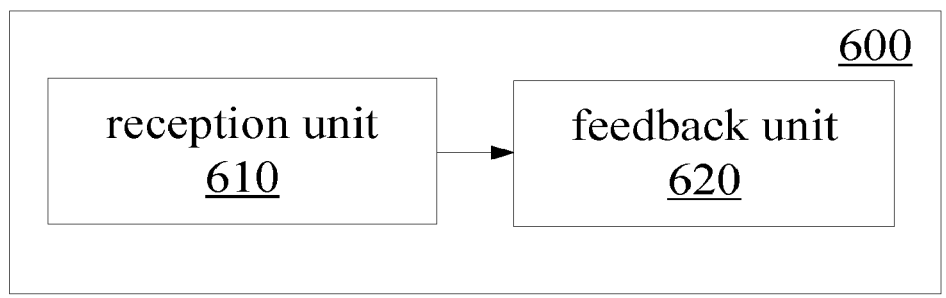
FIG. 6 is a block diagram showing a configuration example of a wireless communication device for a UE side according to another embodiment of the disclosure.

As shown in FIG. 6, the wireless communication device 600 according to the embodiment functions as a user equipment side which is not the initiator of the D2D communication. The wireless communication device 600 includes a reception unit 610 and a feedback unit 620.

The reception device 610 is configured for receiving a D2D communication signal from another UE. The other UE may be the master communication device functioning as the D2D initiator with the configuration as previously described with reference to FIG. 1. The D2D communication signal may include a D2D discovery signal, a D2D scheduling assignment signal and a D2D data transmission signal.

The feedback unit 620 is configured for transmitting a feedback signal with respect to the D2D communication signal, where the feedback signal includes reception quality information regarding the D2D communication signal. According to an embodiment, the feedback signal may include identification information of the wireless communication device 600, the identification information being used for identifying the wireless communication device 600 while indicating the reception quality with respect to the communication signal.

For example, the feedback may be performed by randomly selecting a cycle shift and an orthogonal spreading code in a selectable set, where the randomly selected cycle shift and orthogonal spreading code may be used as identification information for being distinguished from other communication devices performing feedback with respect to the D2D communication signal.

The feedback unit may transmit the feedback signal with a predetermined transmission power, for example, may transmit the feedback signal with the transmission power specified by the D2D communication initiator.

According to an embodiment, the feedback unit determines the transmission power of the feedback signal according to a reference feedback power and an offset compensation, where the offset compensation is determined according to the reception quality with respect to the D2D communication signal received by the reception unit. The reference feedback power may be a maximum transmission power of the wireless communication device, or may be a transmission power of the D2D communication signal. In other words, in a case where the reception quality with respect to a signal from the D2D initiator is well, it is estimated accordingly that the reception quality of the D2D initiator with respect to the feedback signal should be well, thus the feedback may be performed with a relatively low transmission power. In contrast, in a case of where the reception quality with respect to the signal from the D2D initiator is poor, it is estimated accordingly that the reception quality of the D2D initiator with respect to the feedback signal should be poor, thus the feedback may be performed with a relatively high transmission power. With this configuration, a user initiating the D2D communication is enabled to receive the feedback signal effectively, and interference of the feedback signal on other neighboring communication devices or base stations can be reduced.

For example, in a case where the range of the channel quality is divided 5 intervals, [−10, −8], [−8, −3], [−3, 3], [3, 10], [10, 30], for the signal reception quality intervals of which the reception quality varies from low to high in the sequence listed, the transmission power of the feedback signal may be reduced in sequence. The transmission power of the feedback signal may be acquired by subtracting a corresponding offset compensation power from a fixed transmission power. For example, the offset compensation may be performed with a compensation offset derived by multiplexing the unit of 1 dbm by an offset compensation parameter of each of the intervals. Alternatively, for a specific reception quality interval, offset compensation is performed uniformly according to an offset value of a certain specific feedback power. In a case where the transmission power of the D2D initiator is taken as the reference power, firstly, a path-loss compensation is determined according to the transmission power of the initiating user and the reception power of the receiving end, and an offset value of the transmission power is determined to be added on the basis of the path-loss compensation according to the fed back modulation coding scheme thereby ensuring that the feedback message can by received by the transmitting end. Further, the offset value may be adjusted to balance between saving feedback transmission power and ensuring reception quality with respect to the feedback signal.

The wireless communication device according to this embodiment may determine relevant information contained in the D2D communication signal and embed information for indicating the signal reception quality in the feedback signal in the following manner.

According to an embodiment, the reception unit 610 determines transmission power information and/or reception quality feedback period information contained in a D2D discovery signal, a D2D scheduling assignment signal or a D2D data transmission signal according to a Zad-Off Chu scrambled sequence of the communication signal and a cycle shift thereof or related notification information contained in the communication signal.

The feedback unit 620 embeds the identification information of the wireless communication device 600 in the feedback signal by modulating the feedback signal and/or code division multiplexing the feedback signal using an orthogonal spreading code according to a Zad-off Chu sequence associated with the identification information in the D2D discovery signal, where a cycle shift and/or an orthogonal spreading code is selected randomly in a predetermined set.

In a case where the transmission power of the feedback signal is specified in the communication signal received from the D2D initiator, the feedback device 620 may embed the reception quality information in the feedback signal by transmitting the feedback signal with the specified transmission power. In other words, the feedback unit 620 transmits the feedback signal with the specified transmission power, and the D2D initiator can determine the reception quality of the wireless communication device 600 with respect to the D2D communication signal according to the reception quality with respect to the actually received feedback signal.

In addition, the feedback unit 620 may also indicate the reception quality by a Zad-Off Chu cycle shift sequence and/or an orthogonal spreading code, or embed an information bit indicating the reception quality in the feedback signal.

The specific feedback manner is the same as those described in the above examples and thus the description is omitted herein Next, a wireless communication method according to an embodiment is described with reference to FIG. 7. The wireless communication method is applicable to a wireless communication device of the D2D communication which is not the initiator.

Figure 7:
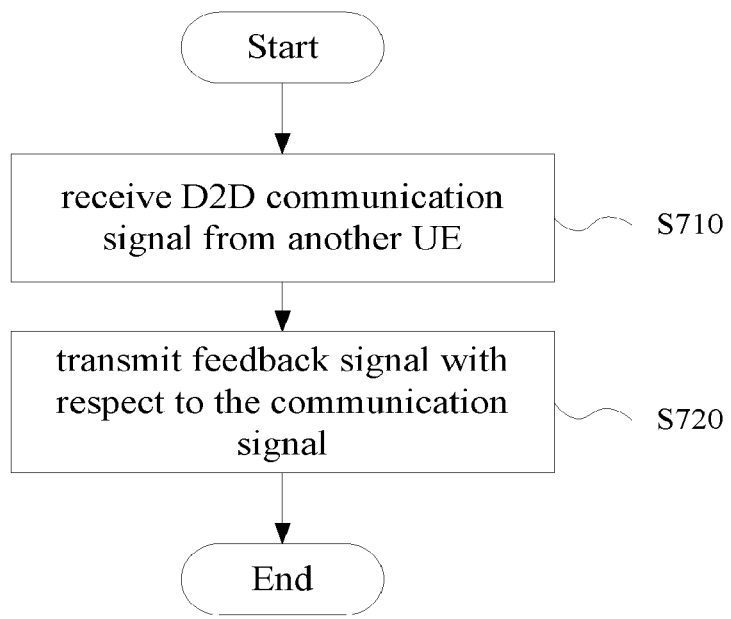
FIG. 7 is a flow chart illustrating a procedure example of a wireless communication method performed by a wireless communication device according to another embodiment of the disclosure.

As shown in FIG. 7, in step S710, a D2D communication signal is received from another UE. The other UE is, for example, the device initiating the D2D communication. The D2D communication signal may include, for example, a D2D discovery signal, a D2D scheduling assignment signal and a D2D data transmission signal.

In step S720, a feedback signal with respect to the communication signal is transmitted, where the feedback signal includes identification information of the present communication device and information regarding reception quality with respect to the communication signal.

Next, embodiments of device configuration and method for the communication device for the base station side according to another aspect of the disclosure are described.

Figure 8:
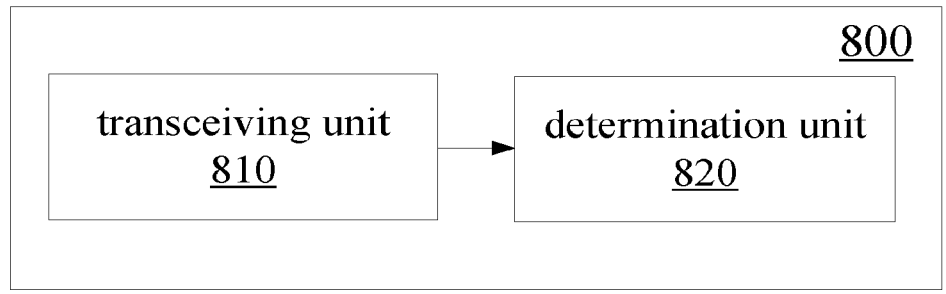
FIG. 8 is a block diagram showing a configuration example of a wireless communication device for a base station side according to another embodiment of the disclosure.

As shown in FIG. 8, the communication device 800 for a base station side includes a transceiving unit 810 and a determination device 820. The communication device 800 may be configured for, for example, performing a D2D resource assignment and control in a network-assisted D2D resource assignment mode.

The transceiving unit 810 is configured for receiving reported information such as a coverage adjustment request from a first communication device (i.e., a D2D master communication device). The reported information includes information on a reception quality of an object communication device to perform D2D communication with the first communication device with respect to a communication signal of the first communication device, or suggested transmission parameter adjustment information of the first communication device.

The determination unit 820 is configured for determining, based on a profile of the reception quality of the object communication device, an adjustment manner for the coverage of the communication signal of the first communication device for the D2D communication. The determination unit 820 may determine the adjustment manner of the coverage using the predetermined strategy used in the above embodiment described in conjunction with FIG. 1.

The adjustment manner determined by the determination unit 820 may include adjustment of a transmission power, a modulation coding scheme, or both the transmission power and the modulation coding scheme, of the communication signal of the first communication device.

Particularly, the determination unit 820 may generate a control command, for example, coverage adjustment confirmation information, based on the reported information. The transceiving device 810 may transmit the control command to the first communication device, where the control command includes at least one of: information for adjusting the transmission power and/or the modulation coding scheme of the first communication device, information of an offset value for adjusting the transmission power and/or the modulation coding scheme of the first communication device, the adjusted transmission power and/or the modulation coding scheme parameter of the first communication device, and information on whether a transmission parameter of a D2D discovery signal or a transmission parameter of a D2D data transmission signal of the first communication device is to be adjusted. Further, in a case where the information reported by the first communication device includes the suggested transmission parameter adjustment information, the control command may only include confirmation information indicating agreement or rejection.

In addition, the determination unit 820 may further determine the adjustment manner based on an interference of the communication signal of the first communication device on signal transmission of another communication device.

It may be selected whether to adjust the transmission power or adjust the modulation manner, or to adjust both the transmission power and the modulation manner according to an interference level. Further, different adjustment strategies may be adopted according to interference level intervals. For example, in a case of a high interference level, for example, interference greater than a first threshold level, the modulation manner may be preferentially adjusted, for example, to a more robust modulation manner; in a case of a moderate interference level, for example, interference greater than a second threshold level and less than the first threshold level (where the second threshold level is lower than first threshold level), in addition to adjusting to a more robust modulation manner, the transmission power is increased; in a case of a low interference level, for example, interference less than the second threshold level, the transmission power is preferentially increased.

In addition, the determination unit 820 may estimate its interference on a neighboring cell or communication device according to position information of the communication device. In a case where the signal coverage of the first communication device is to be increased, it is determined that the modulation coding scheme of the first communication device is adjusted such that robustness of the modulation coding scheme after the adjustment is better than the modulation coding scheme before the adjustment, if it is estimated from position information of the first communication device that interference of the first communication device on the signal transmission of a communication device in the present cell and/or an adjacent cell is higher than a predetermined level. By increasing the coverage though adjusting the modulation coding scheme instead of increasing the transmission power, increasing of interference on other cells or communication devices may be avoided.

In another example of the disclosure, the determination unit 820 may further instruct the first communication device to accordingly adjust its signal transmission parameters according to the current interference of the communication device on other network nodes. For example, in a case where the current signal coverage of the first communication device satisfies its communication requirement, if the determination unit 820 determines that the interference of the first communication device on signal transmission of another network node is greater than a predetermined level, adjustment of a D2D signal transmission parameter may be triggered actively based on the interference, for example, by controlling the first communication device, through a control command, to lower the transmission power and adopt a modulation coding scheme with a robustness better than that of the previous modulation coding scheme, in order to maintain the signal coverage to a certain extent while lowering interference on other network nodes. In this example, before issuing the transmission parameter adjustment control command, the determination device 820 may further require the first communication device to report information on the most recent reception quality of the target communication device with respect to the communication signal of the first communication device, in order to determine a specific adjustment parameter.

Next, a wireless communication control method performed by a base station according to an embodiment is described with reference to FIG. 9. The method may be used for performing D2D resource assignment and control in a network-assisted D2D resource assignment mode.

Figure 9:
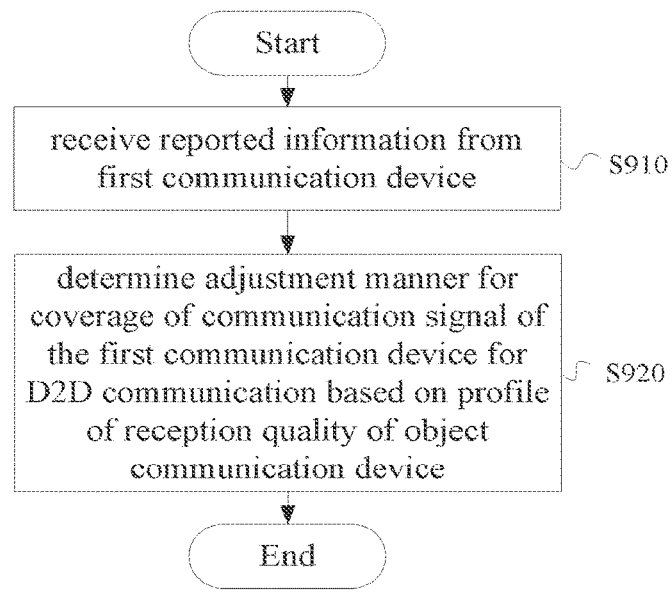
FIG. 9 is a flow chart illustrating a procedure example of a wireless communication control method performed by a base station according to another embodiment of the disclosure.

As shown in FIG. 9, in S910, reported information, for example, a coverage adjustment request, is received from a first communication device (i.e., a D2D master communication device), the reported information including information on reception quality of an object communication device to perform D2D communication with the first communication device with respect to a communication signal of the first communication device, or suggested transmission parameter adjustment information of the first communication device.

In S920, an adjustment manner for the coverage of the communication signal of the first communication device for the D2D communication is determined based on the profile of the reception quality of the object communication device.

In addition to the above embodiments, the embodiments of the disclosure further include an electronic device for a UE side, which includes: a circuit or one or more processors configured for determining a reception quality of another UE with respect to a D2D communication signal based on a feedback signal of the other UE with respect to the communication signal of the UE, and adjusting the signal coverage of the UE based on a profile of the reception quality of the other UE.

According to another embodiment of the disclosure, it is provided an electronic device for a UE side, which includes a circuit or one or more processors configured for determining reception quality with respect to a D2D signal from another UE, and generating a feedback signal of the electronic device with respect to the communication signal for the other UE, where the feedback signal includes identification information of the electronic device and reception quality information regarding the communication signal.

According to yet another embodiment of the disclosure, an electronic device for a base station side is provided, which includes a circuit or one or more processors configured for determining a profile of reception quality of an object communication device to perform D2D communication with a first communication device with respect to a communication signal of the first communication device based on reported information of the first communication device, and determining, based on the profile of the reception quality, an adjusting manner for the coverage of the communication signal of the first communication device for the D2D communication.

As an example, various steps of the above methods and various components and/or units of the above device may be implemented as software, firmware, hardware or a combination thereof. In a case of implementing in software or firmware, a program of a software for implementing the above methods may be installed from a storage medium or a network to a computer (such as the general-purpose computer 1100 shown in FIG. 11) having dedicated hardware. The computer can perform various functions if installed with various programs.

Figure 11:
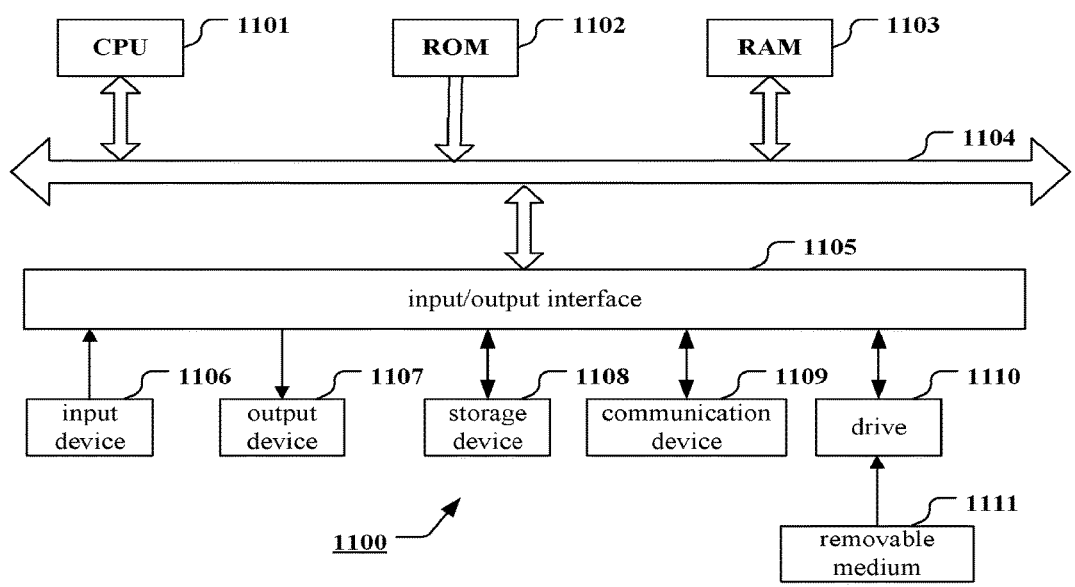
FIG. 11 is a block diagram showing an exemplary configuration of a computer for implementing the method and the device according to the disclosure.

In FIG. 11, a computation processing unit (i.e., a CPU) 1101 executes various processing according to a program stored in a Read Only Memory (ROM) 1102 or a program loaded to a Random Access Memory (RAM) 1103 from a storage device 1108. In the RANI 1103, if necessary, data required for the CPU 1101 in executing various processing and the like is also stored. The CPU 1101, the ROM 1102 and the RAM 1103 are linked to each other via a bus 1104. An input/output interface 1105 is also linked to the bus 1104.

The following components are linked to the input/output interface 1105: an input device 1106 including a keyboard, a mouse and the like, an output device 1107 including a display such as a Cathode Ray Tube (CRT) and a Liquid Crystal Display (LCD), a speaker and the like, the storage device 1108 such as a hard disk and the like, and a communication device 1109 such as a network interface card like a LAN card, a modem and the like. The communication device 1109 performs communication processing via a network such as the Internet. If necessary, a drive 1110 can also be linked to the input/output interface 1105. A removable medium 1111 such as a magnetic disk, an optical disk, a magneto-optical disk, a semiconductor memory and the like is mounted on the drive 1110 as required such that a computer program read out therefrom is installed in the storage device 1108 as required.

In a case where the series of processing above is implemented in software, a program constituting the software is installed from the network such as the Internet or the storage medium such as the removable medium 1111.

It should be understood by those skilled in the art that the storage medium is not limited to the removable medium 1111 shown in FIG. 11 in which the program is stored and which is distributed separately from the device so as to provide the program to the user. Examples of the removable medium 1111 include a magnetic disk including a Floppy Disk (registered trademark), an optical disk including a Compact Disk Read Only Memory (CD-ROM) and a Digital Versatile Disc (DVD), a magneto-optical disk including a MiniDisc (MD) (registered trademark), and a semiconductor memory. Alternatively, the storage medium may be the ROM 1102, the hard disk contained in the storage device 1108 or the like. Herein, the program is stored in the storage medium, and the storage medium is distributed to the user together with the device containing the storage medium.

Embodiments of the present disclosure also relates to a program product on which machine-readable instruction codes are stored. The instruction codes can perform the methods according to the above embodiment when read and executed by a machine.

Accordingly, the present disclosure also includes storage medium carrying the program product on which the machine-readable instruction codes are stored. The storage media includes a soft-disk, an optical disk, a magnetic disk, a storage card, a storage stick and the like, but is not limited thereto.

Embodiments of the present disclosure also relates to the following electronic device. In a case where the electronic device is used for the base station side, the electronic device may be implemented as any type of evolved node B (eNB), such as a macro eNB and a small eNB. The small eNB may be an eNB which covers a cell smaller than a macro cell, such as a pico eNB, a micro eNB and a home (femto) eNB. Alternatively, the electronic device may be implemented as any other type of base station, such as NodeB and a base station transceiver (BTS). The electronic device may include: a main body (also referred to as a base station equipment) configured to control the wireless communication, and one or more remote radio header (RRH) provided at a different point from the main body. Further, the various types of terminals described hereinafter may serve as a base station by performing the base station function temporarily or semi-permanently.

In a case where the electronic device is used for the base station side, the electronic device may be implemented as a mobile terminal (such as a smart phone, a panel personal computer (PC), a notebook PC, a portable game terminal, a portable/softdog mobile router and a digital camera device) or an vehicle-mounted terminal (such as a car navigation device). Further, the electronic device may be a wireless communication module mounted on each of the above terminals (such as the integrated circuit module including a single wafer or a plurality of wafers).

[An Application Example of a Terminal Device]

(First Application Example)

Figure 12:
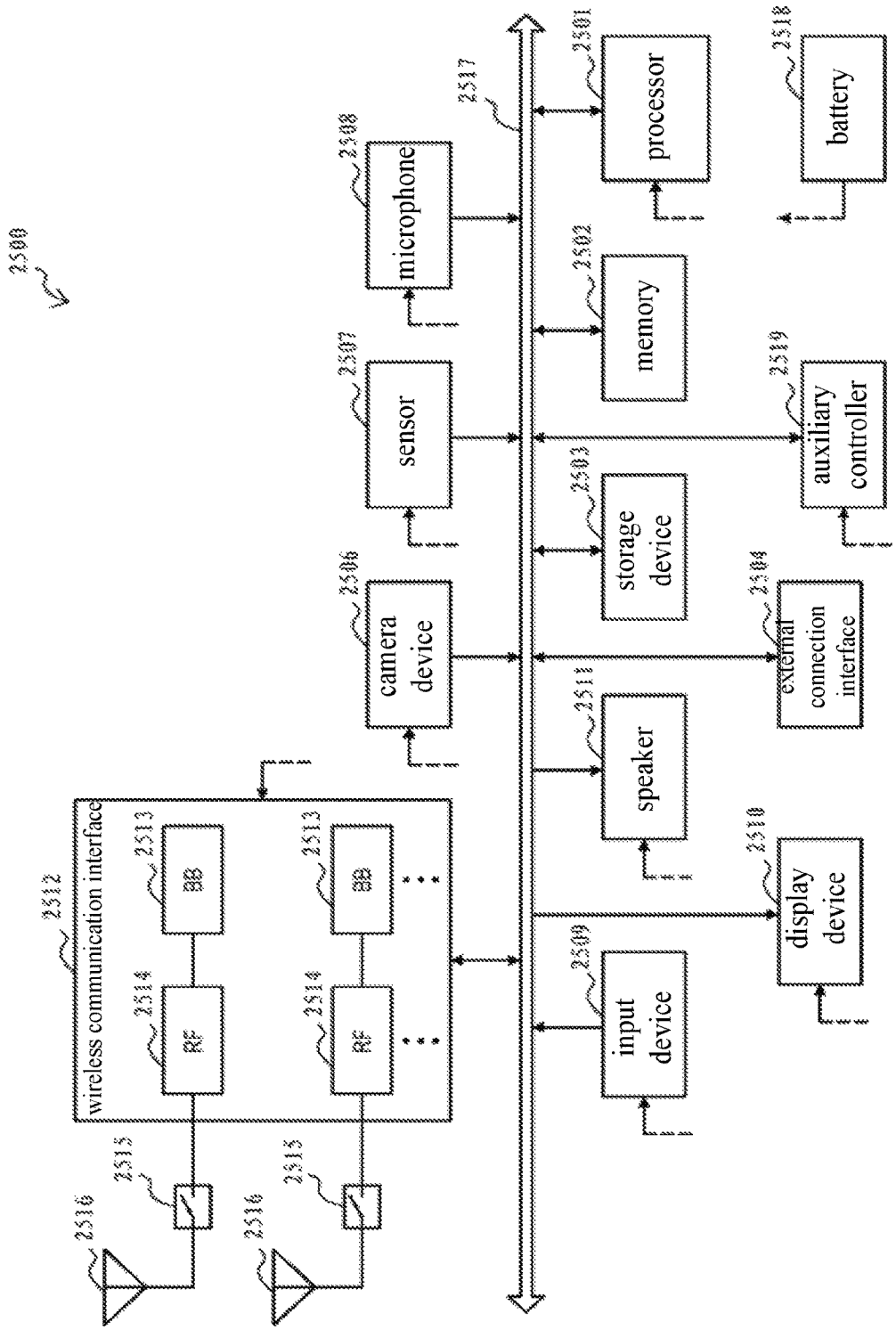
FIG. 12 is a block diagram showing an example of a schematic configuration of a smart phone in which the technique of the disclosure can be applied.

FIG. 12 is a block diagram showing an example of a schematic configuration of a smart phone 2500 in which the technique of the disclosure can be applied. The smart phone 2500 includes a processor 2501, a memory 2502, a storage device 2503, an external connection interface 2504, a camera device 2506, a sensor 2507, a microphone 2508, an input device 2509, a display device 2510, a speaker 2511, a wireless communication interface 2512, one or more antenna switch 2515, one or more antenna 2516, a bus 2517, a battery 2518 and an auxiliary controller 2519.

The processor 2501 may be for example the CPU or a system on chip (SoC), and control the functions of the application layer and another layer of the smart phone 2500. The memory 2502 includes a RAM and a ROM, and stores the data and the program to be performed by the processor 2501. The storage device 2503 may include a storage memory, such as a semiconductor memory and a hard disk. The external connection interface 2504 is an interface for connecting an external device (such as a memory card or a universal serial bus (USB) device) to the smart phone 2500.

The camera device 2506 includes an image sensor (such as a charge coupling device (CCD) and a complementary metal oxide semiconductor (CMOS)), and generates a capture image. The sensor 2507 may include a group of sensors, such as a measurement sensor, a gyro sensor, a geomagnetic sensor and an acceleration sensor. The microphone 2508 converts the sound inputted into the smart phone 2500 into an audio signal. The input device 2509 includes for example a touch sensor, a keypad, a keyboard, a button or a switch configured to detect the touch on the screen of the display device 2510, and receives operation or information inputted by the user. The display device 2510 includes a screen (such as the liquid crystal display (LCD) and the organic light emitting diode (OLED)), and displays the output image from the smart phone 2500. The speaker 2511 converts the audio signal outputted from the smart phone 2500 into the sound.

The wireless communication interface 2512 supports any cellular communication scheme (such as the LTE and the LTE-advanced), and performs the wireless communication. The wireless communication interface 2512 may generally include for example a BB processor 2513 and a RF circuit 2514. The BB processor 2513 may perform for example coding/decoding, modulation/demodulation and multiplexing/de-multiplexing, and perform various types of signal processes for wireless communication. In addition, the RF circuit 2514 may include for example a mixer, a filter and an amplifier, and transmit and receive the wireless signal via the antenna 2516. The wireless communication interface 2512 may be a chip module on which the BB processor 2513 and the RF circuit 2514 are integrated. As shown in FIG. 12, the wireless communication interface 2512 may include multiple BB processors 2513 and multiple RF circuits 2514. Although an example in which the wireless communication interface 2512 including multiple BB processors 2513 and multiple RF circuits 2514 is shown in FIG. 12, the wireless communication interface 2512 may include a single BB processor 2513 and a single RF circuit 2514.

Further, in addition to the cellular communication scheme, the wireless communication interface 2512 may support another type of wireless communication scheme, such as short-range wireless communication scheme, a near field communication scheme and a wireless local area network (LAN) scheme. In this case, the wireless communication interface 2512 may include the BB processor 2513 and the RF circuit 2514 for each wireless communication scheme.

Each of the antenna switches 2515 switches the connection destination of the antenna 2516 among the multiple circuits (such as circuits for different wireless communication schemes) included in the wireless communication interface 2512.

Each of the antennas 2516 includes a single one or multiple antenna element (such as the multiple antenna elements included in the MIMO antenna), and is used for transmitting and receiving the wireless signal by the wireless communication interface 2512. As shown in FIG. 12, the smart phone 2500 may include multiple antennas 2516. Although an example in which the smart phone 2500 includes multiple antennas 2516 is shown in FIG. 12, the smart phone 2500 may include a single antenna 2516.

Further, the smart phone 2500 may include the antenna 2516 for each of the wireless communication solutions. In this case, the antenna switch 2515 may be omitted from of the configuration of the smart phone 2500.

The bus 2517 is used to connect the processor 2501, the memory 2502, the storage device 2503, the external connection interface 2504, the camera device 2506, the sensor 2507, the microphone 2508, the input device 2509, the display device 2510, the speaker 2511, the wireless communication interface 2512 and an auxiliary controller 2519 to each other. The battery 2518 supplies power to respective blocks of the smart phone 2500 shown in FIG. 12 via the feeding line, which is shown as a dashed line in the drawings. The auxiliary controller 2519 operates the minimum necessary function of the smart phone 2500 in the sleep mode for example.

In the smart phone 2500 as shown in FIG. 12, at least some of the functions of the signal transceiving unit 110, the reception unit 610 and the feedback unit 620 described referring to FIGS. 1 and 6 may be implemented by the wireless communication interface 2512. At least some of the functions of the control unit 120 and the feedback unit 620 described referring to FIGS. 1 and 6 may also be implemented by the processor 2501 or the auxiliary controller 2519. Further, the processor 2501 may implementing the method described referring to FIG. 5 or 7 by executing the program stored in the memory 2502.

(A Second Application Example)

Figure 13:
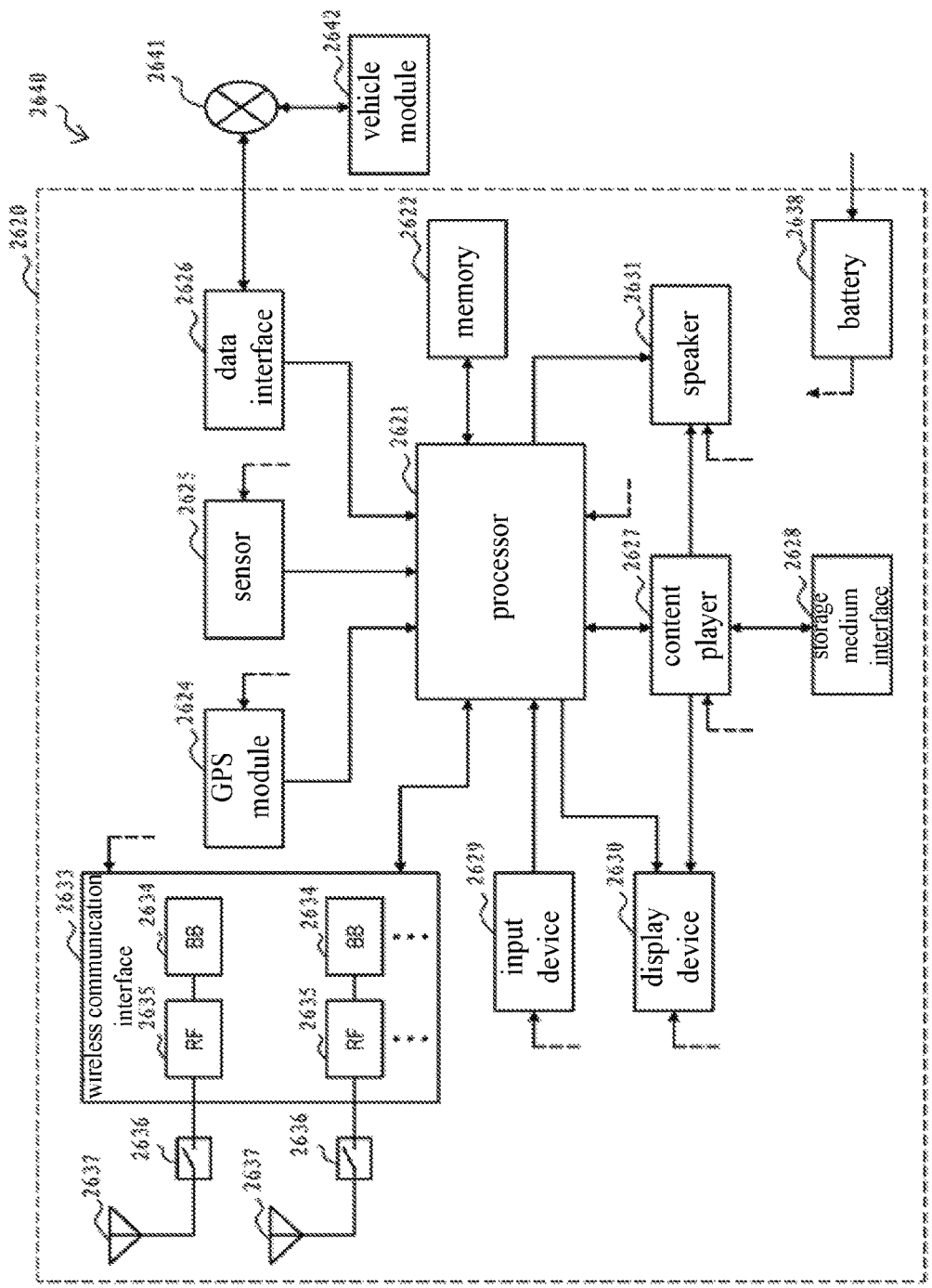
FIG. 13 is a block diagram showing an example of a schematic configuration of a vehicle navigation device in which the technique of the disclosure can be applied.

FIG. 13 is a block diagram showing an example of a schematic configuration of a car navigation device 2620 in which the technique of the disclosure can be applied. The car navigation device 2620 includes a processor 2621, a memory 2622, a global positioning system (GPS) module 2624, a sensor 2625, a data interface 2626, a content player 2627, a storage medium interface 2628, an input device 2629, a display device 2630, a speaker 2631, a wireless communication interface 2633, one or more antenna switch 2636, one or more antenna 2637 and a battery 2638.

The processor 2621 may be for example the CPU or the SoC, and control a navigation function and other functions of the car navigation device 2620. The memory 2622 includes a RAM and a ROM, and stores the data and the program to be performed by the processor 2621.

The GPS module 2624 measures the position (such as latitude, longitude and height) of the car navigation device 2620 using the GPS signal received from the GPS satellite. The sensor 2625 may include a group of sensors, such as a gyro sensor, a geomagnetic sensor and an air pressure sensor. The data interface 2626 is connected to the in-vehicle network 2641 via a terminal not shown, and acquires the data generated by the vehicle (such as vehicle speed data).

The content player 2627 reproduces the content stored in the storage medium (such as CD and DVD), and the storage medium is inserted into the storage medium interface 2628. The input device 2629 includes for example a touch sensor, a button or a switch configured to detect the touch on the screen of the display device 2630, and receives the operation or information inputted by the user. The display device 2630 includes a screen such as a LCD or a OLED display, and displays the image of the navigation function or the reproduced content. The speaker 2631 outputs the sound of the navigation function or the reproduced content.

The wireless communication interface 2633 supports any cellular communication scheme (such as the LTE and the LTE-advanced), and performs the wireless communication. The wireless communication interface 2633 may generally include for example a BB processor 2634 and a RF circuit 2635. The BB processor 2634 may perform for example coding/decoding, modulation/demodulation and multiplexing/de-multiplexing, and perform various types of signal processes for wireless communication. In addition, the RF circuit 2635 may include for example a mixer, a filter and an amplifier, and transmit and receive the wireless signal via the antenna 2637. The wireless communication interface 2633 may be a chip module on which the BB processor 2634 and the RF circuit 2635 are integrated. As shown in FIG. 13, the wireless communication interface 2633 may include multiple BB processors 2634 and multiple RF circuits 2635. Although an example in which the wireless communication interface 2633 includes multiple BB processors 2634 and multiple RF circuits 2635 is shown in FIG. 13, the wireless communication interface 2633 may include a single BB processor 2634 and a single RF circuit 2635.

Further, in addition to the cellular communication scheme, the wireless communication interface 2633 may support another type of wireless communication scheme, such as short-range wireless communication scheme, a near field communication scheme and a wireless LAN scheme. In this case, the wireless communication interface 2633 may include the BB processor 2634 and the RF circuit 2635 for each wireless communication scheme.

Each of the antenna switches 2636 switches the connection destination of the antenna 2637 among the multiple circuits (such as circuits for different wireless communication schemes) included in the wireless communication interface 2633.

Each of the antennas 2637 includes a single one or multiple antenna element (such as the multiple antenna elements included in the MIMO antenna), and is used for transmitting and receiving the wireless signal by the wireless communication interface 2633. As shown in FIG. 13, the car navigation device 2620 may include multiple antennas 2637. Although an example in which the car navigation device 2620 includes multiple antennas 2637 is shown in FIG. 13, the car navigation device 2620 may include a single antenna 2637.

Further, the car navigation device 2620 may include the antenna 2637 for each of the wireless communication solutions. In this case, the antenna switch 2636 may be omitted from of the configuration of the car navigation device 2620.

The battery 2638 supplies power to respective blocks of the car navigation device 2620 shown in FIG. 13 via the feeding line, which is shown as a dashed line in the drawings. The battery 2638 accumulates the power supplied from the vehicle.

In the car navigation device 2620 as shown in FIG. 13, at least some of the functions of the signal transceiving unit 110, the reception unit 610 and the feedback unit 620 described referring to FIGS. 1 and 6 may be implemented by the wireless communication interface 2633. At least some of the functions of the control unit 120 and the feedback unit 620 described referring to FIGS. 1 and 6 may also be implemented by the processor 2621. Further, the processor 2621 may implementing the method described referring to FIG. 5 or 7 by executing the program stored in the memory 2622.

The technique of the disclosure may also be implemented as a vehicle-mounted system (or vehicle) 2640 including one or more blocks of the car navigation device 2620, a vehicle-mounted network 2641 and a vehicle module 2642. The vehicle module 2642 generates the vehicle data (such as vehicle speed, motor speed and fault information), and outputs the generated data to the vehicle-mounted network 2641.

In the above description of embodiments of the present disclosure, a feature described and/or illustrated in an embodiment may be applied to one or more other embodiments in a same or similar manner, or may be combined with a feature in other embodiments, or may replace a feature in other embodiments.

It should be emphasized that, the term "include/contain", as used in the present disclosure, means existence of a feature, an element, a step or a component, but does not exclude existence or addition of one or more other features, elements, steps or components.

In the above examples and embodiments, numeric reference characters are used for representing various steps and/or units. Those skilled in the art should understand that the reference characters are only used for facilitating description and illustration rather than representing an order or other limits.

Furthermore, the methods in the present disclosure are not limited to be performed in the time order as described, but may be performed in other time orders or in parallel or independently. Therefore, the performing order of the method described in the present disclosure is not a limit to the technical scope of the present disclosure.

Although the invention is disclosed by describing specific embodiments of the present disclosure, it should be noted that each of the above examples and embodiments is not for limiting but for illustrating. Those skilled in the art may design various modifications, improvements and equivalents of the present disclosure within the spirit and scope of the appended claims. The modifications, improvements and equivalents should also be construed as being included in the scope of the present disclosure.

The invention claimed is:

1. A wireless communication device for a User Equipment (UE) side, comprising:
   a signal transceiver configured to transmit a Device-to-Device (D2D) communication signal, and to receive a feedback signal from another wireless communication device with respect to the communication signal; and
   control circuitry configured to determine a reception quality of the other communication device with respect to the communication signal based on the feedback, and to adjust a signal coverage of the UE based on a profile of the reception quality of the other communication device,
   wherein the wireless communication device selects one of an autonomous control mode and a network control mode as a control mode of the control circuitry, where the control circuitry adjusts the signal coverage autonomously in the autonomous control mode and the control circuitry adjusts the signal coverage by communicating with a base station in the network control mode, wherein the control circuitry adjusts the signal coverage by communication with the base station and change a modulation coding scheme to increase signal coverage in order that robustness of the adjusted modulation coding scheme is better than that of the modulation coding scheme before the adjustment in response to a determination by the base station that an interference level of the wireless communication device in a present cell and/or an adjacent cell is higher than a predetermined level.

2. The wireless communication device according to claim 1, wherein in the network control mode, the control circuitry controls the signal transceiver to transmit the profile of the reception quality or suggested transmission parameter adjustment information to the base station, and adjusts the signal coverage according to a received control command from the base station, wherein the control command is determined based on at least one of the profile of the reception quality of the other communication device, the suggested transmission parameter adjustment information and an interference of the D2D communication signal on other UE communication, and the suggested transmission parameter adjustment information is determined by the control circuitry based on the profile of the reception quality.

3. The wireless communication device according to claim 2, wherein the suggested transmission parameter adjustment information comprises at least one of:
    a request for adjusting a transmission power and/or a modulation coding scheme;
    an offset value for adjusting the transmission power and/or the modulation coding scheme;
    the profile of the reception quality of the other communication device; and
    whether a transmission parameter of a D2D discovery signal or a transmission parameter of a D2D data transmission signal is to be adjusted.

4. The wireless communication device according to claim 1, wherein the control circuitry adjusts, in the autonomous control mode, the signal coverage according to a predetermined strategy based on the profile of the reception quality of the other communication device.

5. The wireless communication device according to claim 1 wherein the control circuitry adjusts the signal coverage by adjusting a transmission power, the modulation coding scheme, or both the transmission power and the modulation coding scheme of the signal transceiver.

6. The wireless communication device according to claim 5, wherein the control circuitry determines, according to at least one of a network control command, preset information, and history information, a combination of the transmission power and the modulation coding scheme for reaching a target coverage.

7. The wireless communication device according to claim 1, wherein
    the control circuitry or the base station determines an adjustment manner for the signal coverage according to a distribution of the reception quality in a predetermined interval.

8. The wireless communication device according to claim 7, wherein the control circuitry or the base station determines to increase the signal coverage based on at least one of the following cases:
    the number of other communication devices from which a feedback signal is received is lower than a first threshold;
    the number or proportion of the other communication devices in a predetermined number of intervals having the lowest reception quality is higher than a second threshold level; and
    the number or proportion of the other communication devices in a predetermined number of intervals having the highest reception quality is lower than a third threshold level.

9. The wireless communication device according to claim 7, wherein the control circuitry or the base station determines to decrease the signal coverage based on at least one of the following cases:
    the number of the communication devices from which a feedback signal is received is higher than a fourth threshold;
    the number or a proportion of the other communication devices in a predetermined number of intervals having the lowest reception quality is lower than a fifth threshold level; and
    the number or a proportion of the other communication devices in a predetermined number of intervals having the highest reception quality is higher than a sixth threshold level.

10. The wireless communication device according to claim 1, wherein the control circuitry determines the reception quality based on at least one of:
    a signal reception power;
    a signal reception signal-to-noise ratio or signal-to-interference-plus-noise ratio; and
    a signal block error rate.

11. The wireless communication device according to claim 1, wherein the wireless communication device embeds transmission power information and/or reception quality feedback period information of the wireless communication device in the communication signal in one of the following manners:
    using a Zad-Off Chu scrambled sequence of the communication signal and a cycle shift thereof; and
    adding related notification information in the communication signal,
    wherein the communication signal comprises at least one of a D2D discovery signal, a D2D scheduling assignment signal, and a D2D data transmission signal.

12. The wireless communication device according to claim 1, wherein the control circuitry determines the reception quality of the other communication device with respect to the communication signal according to one of the following principles:
    the reception quality is determined according to a reception power of the feedback signal in a ease where feedback signal transmission power of the other communication device is known;
    the reception quality is determined according to a Zad-Off Chu cycle shift sequence and/or an orthogonal spreading code of the feedback signal; and
    the reception quality is determined according to an information bit contained in the feedback signal.

13. A wireless communication method performed by a wireless communication device, comprising:
    transmitting a D2D communication signal;
    receiving a feedback signal from another wireless communication device with respect to the communication signal;

determining a reception quality of the other communication device with respect to the communication signal based on the feedback signal; and adjusting, by control circuitry, a signal coverage of the communication signal based on a profile of the reception quality of the other communication device, wherein the wireless communication device selects one of an autonomous control mode and a network control mode as a control mode of the control circuitry, where the control circuitry adjusts the signal coverage autonomously in the autonomous control mode and the control circuitry adjusts the signal coverage by communicating with a base station in the network control mode, and the wireless communication device adjusts the signal coverage by communication with the base station and changing a modulation coding scheme to increase signal coverage in order that robustness of the adjusted modulation coding scheme is better than that of the modulation coding scheme before the adjustment in response to a determination by the base station that an interference level of the wireless communication device in a present cell and/or an adjacent cell is higher than a predetermined level.

14. A communication device for a base station side, comprising:

a transceiver configured for receiving reported information from a first communication device, the reported information comprising information on reception quality of an object communication device to perform a D2D communication with the first communication device with respect to a communication signal sent by the first communication device; and circuitry configured for determining, based on a profile of the reception quality of the object communication device, an adjustment manner for a signal coverage of the communication signal of the first communication device for the D2D communication, wherein the circuitry is configured, in a case where the signal coverage of the first communication device is to be increased, determining to adjust the modulation coding scheme of the first communication device in order that robustness of the modulation coding scheme after the adjustment is better than that of the modulation coding scheme before the adjustment, if it is estimated from position information of the first communication device that an interference of the first communication device on a signal transmission of a communication device in a present cell and/or an adjacent cell is higher than a predetermined level.

15. The wireless Communication device according to claim 14, wherein the adjustment manner determined by the circuitry comprises adjusting a transmission power, a modulation coding scheme, or both the transmission power and the modulation coding scheme of the communication signal of the first communication device.

16. The wireless communication device according to claim 15, wherein the circuitry is further configured for generating a control command based on the reported information, the transceiver is further configured for transmitting the control command to the first communication device, the control command comprising at least one of:

adjusting the transmission power and/or the modulation coding scheme of the first communication device;

an offset value for adjusting the transmission power and/or the modulation coding scheme of the first communication device; and whether a transmission parameter of a D2D discovery signal or a transmission parameter of a D2D data transmission signal of the first communication device is to be adjusted.

17. The wireless communication device according to claim 15, wherein the circuitry is configured for determining the adjustment manner based on an interference of the communication signal of the first communication device on signal transmission of another communication device.

18. A wireless communication control method performed by a base station, comprising:

receiving reported information from a first communication device, the reported information comprising is formation on reception quality of an object communication device to perform a D2D communication with the first communication device with respect to a communication signal sent by the first communication device; and determining, based on a profile of the reception quality of the object communication device, an adjusting manner for a signal coverage of the communication signal of the first communication device for the D2D communication, and in a case where the signal coverage of the first communication device is to be increased, determining to adjust the modulation coding scheme of the first communication device in order that robustness of the modulation coding scheme after the adjustment is better than that of the modulation coding scheme before the adjustment, if it is estimated from position information of the first communication device that an interference of the first communication device on a signal transmission of a communication device in a present cell and/or an adjacent cell is higher than a predetermined level.

* * * * *